Dec. 1, 1925.

J. SLEPIAN 1,563,407

MECHANICAL RECTIFYING SYSTEM

Filed Sept. 25, 1919

WITNESSES:
H. J. Shelhamer
D. C. Davis

INVENTOR
Joseph Slepian
BY
Wesley G. Carr
ATTORNEY

Patented Dec. 1, 1925.

1,563,407

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

MECHANICAL RECTIFYING SYSTEM.

Application filed September 25, 1919. Serial No. 326,318.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Mechanical Rectifying Systems, of which the following is a specification.

My invention relates to systems for the rectification of alternating currents and for the control of the power factor of alternating-current systems, and it has for its object to provide apparatus of the character designated that shall be simple and inexpensive to construct and operate and which shall be highly effective to secure the results specified.

Figure 1:
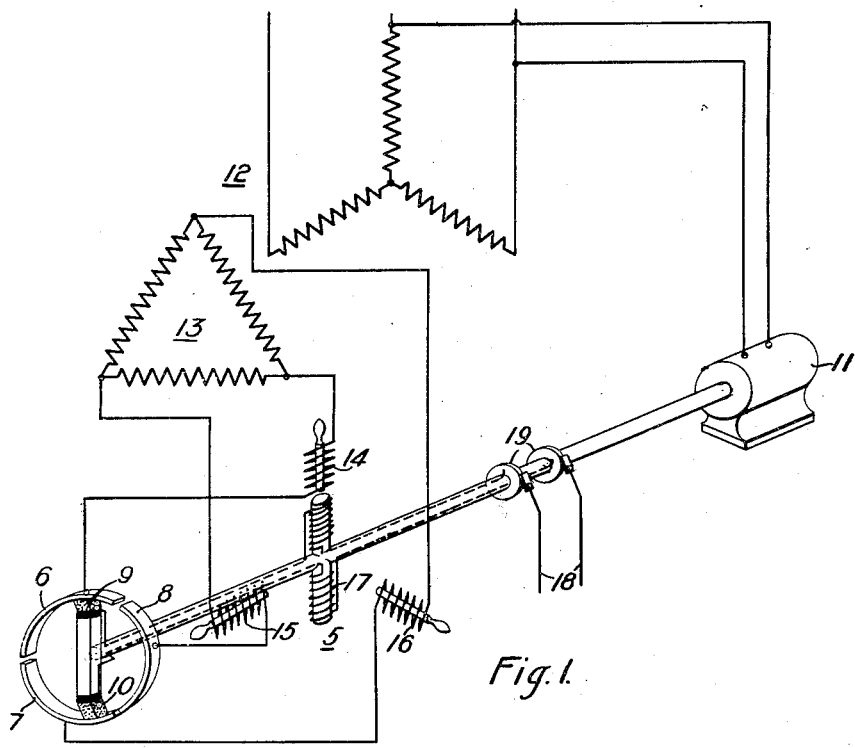
Figure 2:
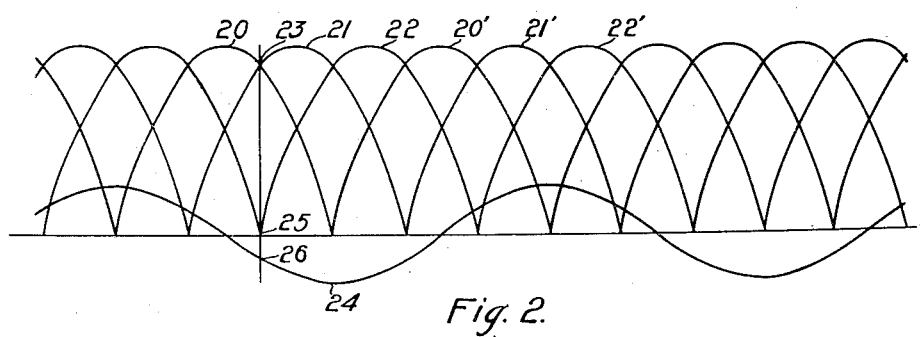

In the accompanying drawing, Fig. 1 is a diagrammatic view of a system of the character designated embodying a preferred form of my invention; and Fig. 2 is a diagram illustrative of the action of the system of Fig. 1.

It has been proposed to produce high-voltage unidirectional electromotive forces by the rectification of a mechanical rectifying device. Commutating segments were connected to appropriate points in a polyphase source and, by the relative synchronous movement of brushes with respect to these segments, rectification was accomplished and a fairly uniform unidirectional electromotive force produced, the uniformity thereof increasing with the number of phases to be rectified.

With systems of the foregoing character, difficulty has been encountered in avoiding sparking at the commutator, principally for the following reasons. If there were no inherent impedance to the circuits, it would be a relatively easy matter to so adjust the angular position of the brushes that they would pass from one segment to another at the instant when the electromotive force between the segments was zero but substantially all alternating-current sources involve inherent impedance and the discharge of this impedance produces flashing. By specific adjustment of the brush position with every degree of load, it would be possible to secure substantially sparkless commutation but, as the load changes and, therefore, the amount of energy to be dissipated from the inductive circuit varies, it would be necessary to produce a corresponding alteration in the brush position, thus involving complicated and easily disarranged apparatus.

Referring to the drawing for a more detailed understanding of my invention, I show a rectifying aggregate at 5 comprising fixed commutating segments 6, 7 and 8, each having an angular length of somewhat less than 120°, with brushes 9 and 10 mounted for rotation thereupon, these brushes being driven by a synchronous motor 11.

A source of alternating current such, for example, as a polyphase transformer 12, is provided, the terminals of the delta-connected secondary winding 13 thereof being connected to the segments 6, 7 and 8 through equi-spaced stator windings 14, 15 and 16 of an auxiliary dynamo-electric machine or booster having a bipolar rotor member 17 mounted to be driven by the motor 11.

A direct-current load circuit 18 is connected to the brushes 9 and 10 through suitable slip rings 19, and one of the direct-current leads is wound around the rotor member 17 for the energization thereof. The motor 11 may be connected across one of the phases of the source 13 to insure synchronous operation of the brushes 9 and 10 and of the rotor 17.

Having thus described the structure of my invention, the operation thereof is as follows. Assuming the absence of inductive reactance in the supply circuit, there would obviously be a continuously recurring instant when the potential of the two ends of one of the phase divisions of the source 13 would be the same and, if a rectifying brush passed from a segment connected to one end of said phase division to the segment connected to the other end thereof, no electromotive force would occur between the segments, and substantially sparkless commutation would, therefore, be effected. Similarly, for any given degree of load and with the corresponding amount of inductive discharge, there would be successive instances when a similar action could be effected. It would be difficult, however, to secure desirable rectification with varying load.

With the structure shown, however, the rotor 17 sweeps by the stator windings 14, 15 and 16 at such time as to induce electromotive forces therein that reduce the potential between adjacent rectifying segments, at the instant a brush passes therebetween, substantially to zero. With an increase of load and a corresponding increase in the intensity of the inductive discharge, there is also a corresponding increase in the magnitude of these compensating electromotive forces, with maintenance of the desired commutating conditions.

By reference to Fig. 2, this action will be more clearly apparent. The electromotive force waves 20—20' are produced by one phase division of the secondary winding 13, the waves 21—21' are similarly produced by another phase division and the waves 22—22' by the remaining one. Current flows from the wave 20 through the load circuit until the point 23 is reached, when the circuit is shifted and the wave 21 takes up the load. The reactive electromotive force, established by inductance in circuit with the electromotive force wave 20, may be represented by a wave 24 having the usual 90° lag and having an effective value, at the time indicated by the point 23, of 25—26. The rotor 17, however, sweeps by the appropriate stator winding at this instant and generates therein a rotational electromotive force equal and opposite to the value 25—25, whereby the reactive electromotive force is neutralized, and sparkless commutation is accordingly promoted.

The auxiliary dynamo-electric machine 14, 15, 16 and 17 of the rectifying aggregate 5 may also be adjusted to act as a synchronous condenser and send alternating currents into the supply system which are leading with respect to the voltage of the same. Such result may, for instance, be obtained by advancing the phase position of the rotor 17 with respect to the phase of the impressed polyphase voltage, as by means of a suitable adjustment of the synchronous driving motor 11. In such case, condenser action will be obtained.

My invention is susceptible of many modifications, such, for example, as transposing the members of the rectifying commutator, moving the segments thereof while having the brushes fixed, or in transposing the elements of the auxiliary booster machine 14, 15, 16, 17 without departing from the spirit thereof.

I claim as my invention:

1. The combination with a mechanical rectifier, of dynamo-electric booster means connected in series with the alternating-current side of said rectifier.

2. The combination with a mechanical rectifier, of dynamo-electric booster means having one winding connected in series with the alternating-current side of the rectifier and another winding connected in series with the direct-current side of the rectifier.

3. The method of improving the commutation of a mechanical rectifier which comprises maintaining the phase relation of the mechanical parts substantially constant and inducing, in the alternating-current side of the rectifier, an electromotive force responsive to the load.

4. The combination with a polyphase mechanical rectifier, of a synchronous dynamo-electric machine having its armature winding connected in series-circuit relation to the alternating-current side of the rectifier and having its exciting winding connected in series-circuit relation to the direct-current side of the rectifier.

5. In a rectifying system, a source of polyphase electromotive force, a rectifying commutator having one sector for each phase and a series-connected generator system dependent upon current flow in said rectifying system to impress electromotive forces on the rectifying commutator sectors.

6. The combination with a source of polyphase electromotive forces, of a commutating segment connected to each of the terminals of said source, respectively, said segments being grouped in a circular path, a pair of brushes disposed for movement relative to said segments, means for driving said brushes at relatively synchronous speed with respect to said segments, each brush passing from one segment to another at the instant when the source of electromotive force therebetween is substantially zero, and a load-responsive synchronous generator for maintaining said electromotive force across said segments substantially at zero under all load conditions while the mechanical phase relation of said brushes to said segments remains constant.

7. In a rectifying system, the combination with a source of polyphase electromotive forces, of a commutating segment connected to each terminal of said source, said segments being grouped in a circular path, a pair of brushes disposed for relative rotation with respect to said segments, means for producing relatively synchronous motion between said segments and said brushes, and an auxiliary dynamo-electric machine comprising a load-energized field member and armature windings connected in circuit between each of the terminals of said source and said segments.

8. In a rectifying system, the combination with a source of polyphase electromotive forces, of a fixed commutating segment connected to each terminal of said source, said segments being disposed in a circular path, a pair of brushes arranged for relative movement over said segments, means for driving said brushes at relatively synchronous speed with respect to said source, an auxiliary dynamo-electric machine embodying a rotor member mounted on the shaft with said brushes and a stator member, leads from said brushes through an energizing winding on said rotor winding to a direct-current load circuit, and connections from the terminals of said source through windings of said stator winding to commutator segments thereof.

In testimony whereof, I have hereunto subscribed my name this 3rd day of Sept., 1919.

JOSEPH SLEPIAN.